Feb. 20, 1940.　　　H. K. WEIHE　　　2,191,054
CYLINDER FOR HYDRAULIC BRAKES
Filed April 10, 1937
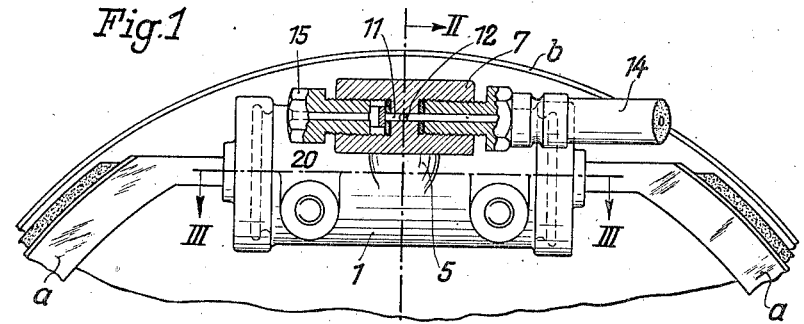
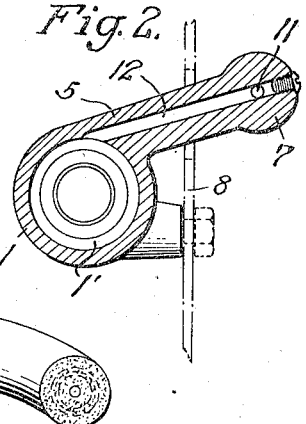
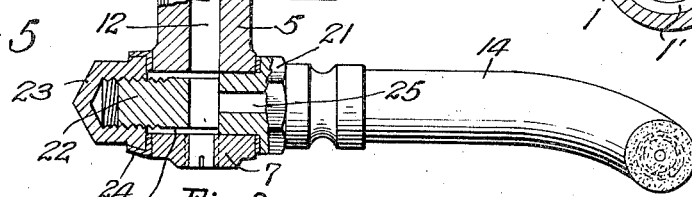
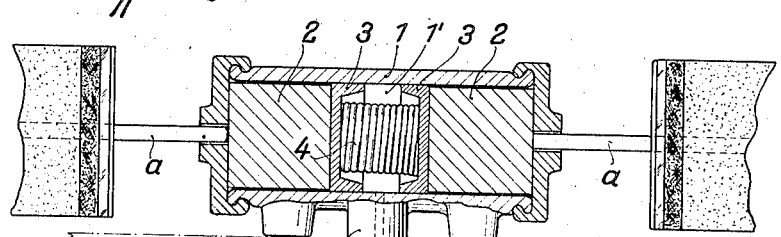
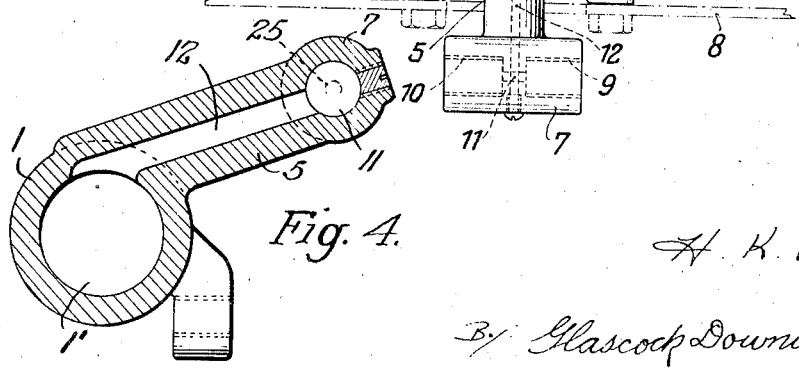
Inventor:
H. K. Weihe
By Glascock Downing & Seebold
Attys Patented Feb. 20, 1940

2,191,054

UNITED STATES PATENT OFFICE 2,191,054

CYLINDER FOR HYDRAULIC BRAKES

Hermann Kurt Weihe, Berlin, Germany

Application April 10, 1937, Serial No. 136,226
In Germany April 11, 1936

3 Claims. (Cl. 60—54.6)

This invention relates to a novel construction of the wheel brake cylinder in hydraulic brakes, more particularly for automobiles.

The wheel brake cylinders hitherto generally used with spreading pistons moving in opposite directions, and usually placed between the ends of the brake blocks, are constructed in a number of parts, and are correspondingly expensive. In particular, the connection of the flexible brake pipe to the cylinders is complicated and difficult, especially in modern vehicles, in which the space available near the wheels is usually rather limited. As a rule, the brake pipe is connected to the cylinder body at the side by means of a separate connection piece. This connection piece is screwed fast to the cylinder body by means of a threaded bolt provided with special passages with interposition of copper ring packing discs. Such a connection however, is not only constructed in a number of parts and expensive but also the numerous sealing points may easily be the cause of interruptions in operation. In particular in the case of faulty assembly or unsatisfactory seating of the packings, it is impossible to avoid the brake fluid escaping from the circuit. Moreover, air can enter the circuit, which is known to be very detrimental for the working of the brakes. Finally, in the known wheel brake cylinders, the removal of air from the circuit is effected by the provision of a separate passage in the cylinder body, which requires a further additional working.

The invention, in contradistinction thereto, provides a wheel brake cylinder for fluid brakes which is considerably simpler and therefore tends to increase the reliability of the brakes. The wheel brake cylinder according to the invention is characterised by a lateral branch inclined upwards for connecting the brake pipe, a rising pipe being provided between the connecting point of the brake pipe and the pressure space of the wheel brake cylinder which is disposed at a lower level. On account of this rising pipe, it is possible to effect the removal of air through the same pipe through which the brake fluid flows. The part used for connecting the brake pipe has a passage extending transversely to the rising pipe. This may be provided with a connecting thread which makes it possible to attach at choice either the air removing screw or the brake pipe, according to which end of the wheel brake cylinder the brake pipe comes to. Very favourable conditions for the removal of air from the wheel brake cylinders are obtained if the diameter of the rising pipe in the lateral connecting piece is made greater than the diameter of the brake pipe.

The invention provides for a diminution of the number of parts as compared with the known wheel brake cylinder constructions and also the particular advantage that the separate air-removing passage, which is generally used, is dispensed with. During the air-removing operation the air escapes through the same rising pipe through which the brake fluid is introduced.

Two constructions of the wheel brake cylinder for hydraulic brake systems according to the invention are illustrated in the accompanying drawing.

Fig. 1 is a side elevation of a brake drum in the upper part with incorporated wheel brake cylinder in part section, Fig. 2 is a cross-section of the wheel brake cylinder on the line II—II of Fig. 1, Fig. 3 is a horizontal section on the line III—III in Fig. 1, Fig. 4 shows a further constructional form of the invention in cross-section, Fig. 5 is a horizontal section through the wheel brake cylinder according to Fig. 4.

In the drawing only those parts of the brake arrangement are shown which are required for understanding the invention.

I is the cylindrical wheel brake body arranged between the blocks $a$ within the brake drum $b$ with the two spreading pistons slidable therein which enclose the pressure space I' between them. In front of each of the pistons 2 as usual a packing sleeve 3 is provided, which sleeves are pressed against the ends of the pistons by the spring 4 in the interior of the pressure space I'. The pistons 2, which are driven in opposite directions, act upon the ends of the brake blocks $a$.

The cylindrical wheel brake body I has, according to the invention, a branch 5 rising obliquely cast on at the side, which passes through an opening in the cover plate of the brake drum to the so-called brake block carrier 8, see Figs. 2 and 3. The wheel brake cylinder I is secured to this carrier by means of screws. The lateral branch 5 runs out into a cylindrical extension 7 arranged parallel to the wheel brake cylinder, which has a passage 11 provided at each end of the screw threads 9, 10 for receiving connecting pieces. From the passage 11 a passage 12 leads to the lower pressure space I' of the cylinder. This passage opens at the highest point into the pressure space I'; as shown in Fig. 2 it forms a rising passage. The two threaded holes 9, 10 serve at choice for connecting the air-removing screw 15 or the brake pipe 14, according to which side the brake pipe 14 comes from.

In order to remove air from the brake system when first filled, the air-removing screw 15 on the brake cylinder 1 is slightly loosened. Then in the usual way the piston in the main brake cylinder (not illustrated) is moved to and fro like a pump by operating the brake lever, so that fluid is forced into the whole brake circuit from the main cylinder. The fluid flows through the pipe 14 into the passage 11 in the cylinder extension 7 of the wheel brake cylinder and further into the outlet bore 20 of the air-removing screw 15. At the same time a certain quantity of fluid flows through the rising passage 12 into the lower pressure space 1' of the wheel brake cylinder. This pressure space becomes slowly filled with fluid and the air contained therein collects above the fluid level, which gradually rises, so that the air is forced through the rising passage 12 and finally into the passage 11, from which it is finally forced out of the brake system through the outlet bore 20 of the air-removing screw 15. With a strong uninterrupted pump action the lateral movement of the fluid column in the passage 12 has an ejector-like action on the interior of the pressure space 1' so that a satisfactory and complete removal of air from the wheel brake cylinder is obtained. Since the air-removing screw 15 is arranged parallel to the wheel brake cylinder, it is also more easily accessible in contradistinction to the hitherto usual arrangement in which it is screwed into the wall of the cylinder transversely thereto.

The construction of the wheel brake cylinder according to Figs. 4 and 5 agrees essentially with that shown in Figs. 1 to 3. The principal difference is that the rising passage 12 is made of greater diameter than the brake pipe 25. Owing to this difference in diameter it has been found that the air can be quickly and reliably removed from the pressure space 1' of the wheel brake cylinder 1. A further difference from the first constructional example is that the connection of the part 7 at the free end of the lateral extension 5 is provided with a smooth passage 11 (without a connecting thread). This passage serves for receiving the connecting nipple 21 of the brake pipe 14, which is provided with a pin-like extension 22 on the upper end of which a thread is cut. The extension 22 is tapered for a part of its length so that between the cylindrical wall of the passage and the extension 22 an annular space is formed. The end of the nipple extension projecting a certain distance out of the passage serves for receiving the cap nut 23 which, when tightened and provided with a locking device 24, ensures reliable and tight connection of the brake pipe 14. As shown in Fig. 5, the nipple extension 22 has a T-shaped passage which provides permanent communication between the brake pipe and the annular space 11 and the rising passage 12. The connecting part 7 makes it possible to attach the brake pipe 14 from either side. For removing air the cap nut 23 is simply loosened slightly. Then during pump-like operation of the brake a certain quantity of the fluid supply from the brake pipe 14 flows through the annular space 11 to the opened end of the connecting part 7. The other much greater part of the brake fluid flows through the rising pipe 12 into the pressure space 1' of the wheel brake cylinder. Since the rising pipe is of greater diameter than the passage 25 of the nipple 21, the rising pipe 12 is not able to become filled so rapidly. In this way the air in the wheel brake cylinder is able to escape along the upper part of the cylindrical wall of the rising passage into the bore 11, from which it escapes together with the fluid passing out through the loosened cap nut 23. On account of this space, a reliable and satisfactory removal of air from the wheel brake cylinder is obtained. An essential feature for the invention claimed is the rising passage 12 between the connecting point of the brake pipe and the lower pressure space of the wheel brake cylinder, whereby this rising passage serves both for supplying the brake fluid and for withdrawing the air during the air-removal operation.

What I claim is:

1. A wheel brake cylinder for hydraulic brakes, comprising in combination, a horizontally arranged main pressure cylinder, brake actuating pistons slidable therein, a lateral connecting piece rising obliquely from said cylinder and provided with a single T-shaped passage, the stem of which communicates with said cylinder, one end of the head of said T-shaped passage being connected with a source of fluid for supplying said fluid to said cylinder and the other end of said head being adapted for the escape of air accumulated in said cylinder and removable means for closing said last mentioned end.

2. A wheel brake cylinder for hydraulic brakes comprising in combination a horizontally arranged main pressure cylinder, brake actuated pistons slidable therein, a lateral connecting piece arising obliquely from said cylinder and provided with a single T-shaped passage, the stem of which communicates with said cylinder, a brake pipe fitting, means for connecting said fitting to said connecting piece to establish communication between one end of the head of said T-shaped passage and said pipe fitting, the other end of said head being adapted for the escape of air accumulated in said cylinder and removable means for closing said last mentioned end, said closure means and said pipe fitting connecting means being interdependent.

3. A wheel brake cylinder for hydraulic brakes comprising in combination a horizontally arranged main pressure cylinder, brake actuated pistons slidable therein, a lateral connecting piece arising obliquely from said cylinder and provided with a single T-shaped passage, the stem of which communicates with said cylinder, a brake pipe fitting, means for connecting said fitting to said connecting piece to establish communication between one end of the head of said T-shaped passage and said pipe fitting, the other end of said head being adapted for the escape of air accumulated in said cylinder and removable means for closing said last mentioned end, the diameter of said passage being greater than the interior diameter of said brake pipe fitting.

HERMANN KURT WEIHE.